United States Patent [19]
Javanifard et al.

[11] Patent Number: 6,160,440
[45] Date of Patent: Dec. 12, 2000

[54] SCALEABLE CHARGE PUMP FOR USE WITH A LOW VOLTAGE POWER SUPPLY

[75] Inventors: Jahanshir J. Javanifard, Sacramento; Mase J. Taub, Elk Grove, both of Calif.

[73] Assignee: Intel Corporation, Santa Clara, Calif.

[21] Appl. No.: 09/161,089

[22] Filed: Sep. 25, 1998

[51] Int. Cl.[7] ........................................... G05F 1/10
[52] U.S. Cl. .............................. 327/536; 327/589; 363/60
[58] Field of Search ..................... 327/536, 537, 327/538, 589; 363/60

[56] References Cited

U.S. PATENT DOCUMENTS

| | | | |
|---|---|---|---|
| 5,414,669 | 5/1995 | Tedrow et al. | 365/226 |
| 5,442,586 | 8/1995 | Javanifard et al. | 365/185 |
| 5,455,794 | 10/1995 | Javanifard et al. | 365/185.18 |
| 5,483,486 | 1/1996 | Javanifard et al. | 365/185.17 |
| 5,524,266 | 6/1996 | Tedrow et al. | 395/800 |
| 5,532,915 | 7/1996 | Pantelakis et al. | 363/60 |
| 5,553,030 | 9/1996 | Tedrow et al. | 365/226 |
| 5,553,295 | 9/1996 | Pantelakis et al. | 395/750 |
| 5,589,793 | 12/1996 | Kassapian | 327/536 |
| 5,602,794 | 2/1997 | Javanifard et al. | 365/226 |
| 5,734,290 | 3/1998 | Chang et al. | 327/536 |
| 5,754,475 | 5/1998 | Caser et al. | 327/536 |
| 5,801,577 | 9/1998 | Tailliet | 327/536 |
| 5,818,289 | 10/1998 | Chevallier et al. | 327/536 |
| 5,821,805 | 10/1998 | Jinbo | 327/536 |

*Primary Examiner*—Jung Ho Kim
*Attorney, Agent, or Firm*—Cynthia T. Faatz

[57] ABSTRACT

A scaleable charge pump. The charge pump is configured on an integrated circuit device that operates at a supply voltage and includes a predetermined number of pump stages coupled in series, at least one of the stages being coupled to receive a first pumped clock signal. An output node coupled in series to one end of the predetermined number of series coupled pump stages provides a pumped output voltage.

17 Claims, 7 Drawing Sheets

SCALEABLE CHARGE PUMP FOR USE WITH A LOW VOLTAGE POWER SUPPLY

FIELD OF THE INVENTION

The present invention relates generally to systems, and more particularly, to a scaleable charge pump for use with a low voltage power supply.

BACKGROUND OF THE INVENTION

There has been a trend toward lowering the power requirements of personal computers and other electronic devices. In order to reduce power consumption, much of the integrated circuitry used in personal computers is being redesigned to run at lower voltage supply levels. For example, many components that were previously designed to work with a 5 volt supply have been redesigned to work with a 3.3 volt supply. Some newer products, and many in development, have even lower supply voltages, which, in many cases, may be below 2 volts.

While supply voltages are being reduced, higher voltages may continue to be used for some computer system features. For example, a flash electrically erasable programmable read only memory (EEPROM) may be used in some computer systems to store the basic input/output system (BIOS) or as a random access memory storage device. Flash memory devices typically use a much higher voltage and higher power for programming and erasing data than can be provided directly by a low voltage power supply.

For example, a negative gate erase technique may be used for some flash EEPROM arrays to reduce the amount of current, and thus, power, during an erase operation. The negative gate erase technique uses a large negative voltage (typically minus nine or ten volts) at the gate terminal of the memory device and Vcc at the source terminal.

To supply the desired negative voltage for a negative gate erase operation, a negative charge pump may be used. One type of negative charge pump is described in U.S. Pat. No. 5,532,915 to Pantelakis et al. and assigned to the assignee of the present invention.

The charge pump of Pantelakis has a drawback, however. At supply voltages below a given level, when p-type (also referred to as p-channel) transistors of Pantelakis are turned on, they may operate in a region in which the transistors experience a measurable threshold voltage drop. If the p-type transistors of Pantelakis are not "fully turned on" such that there is effectively no threshold voltage drop across them when they are operating, additional stages may be required to achieve the same pumped output voltage. Further, the current provided by the charge pump of Pantelakis will be reduced.

If the supply voltage drops below the threshold voltage of one or more of the p-channel transistors, one or more of the transistors may not even be turned on when desired. In such a case, the negative pumped voltage may not be passed from one stage to the next stage. In other words, below a given supply voltage, the negative charge pump of Pantelakis may not work.

SUMMARY OF THE INVENTION

A charge pump for use with a low voltage supply is described. The charge pump is configured on an integrated circuit device that operates at a supply voltage. The charge pump includes a predetermined number of pump stages coupled in series, at least one of the stages being coupled to receive a first pumped clock signal. An output node is coupled in series to one end of the predetermined number of pump stages coupled in series to provide a pumped output voltage.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A method and apparatus for providing a scaleable charge pump for use with a low voltage power supply is described. Although the following embodiments are described with reference to a flash memory used as a mass storage device, alternative embodiments are applicable to other types of circuits, including other types of nonvolatile memories, that may benefit from having a voltage higher or lower than the available supply voltage(s), and/or to other types of flash memories used for other purposes.

Figure 1:
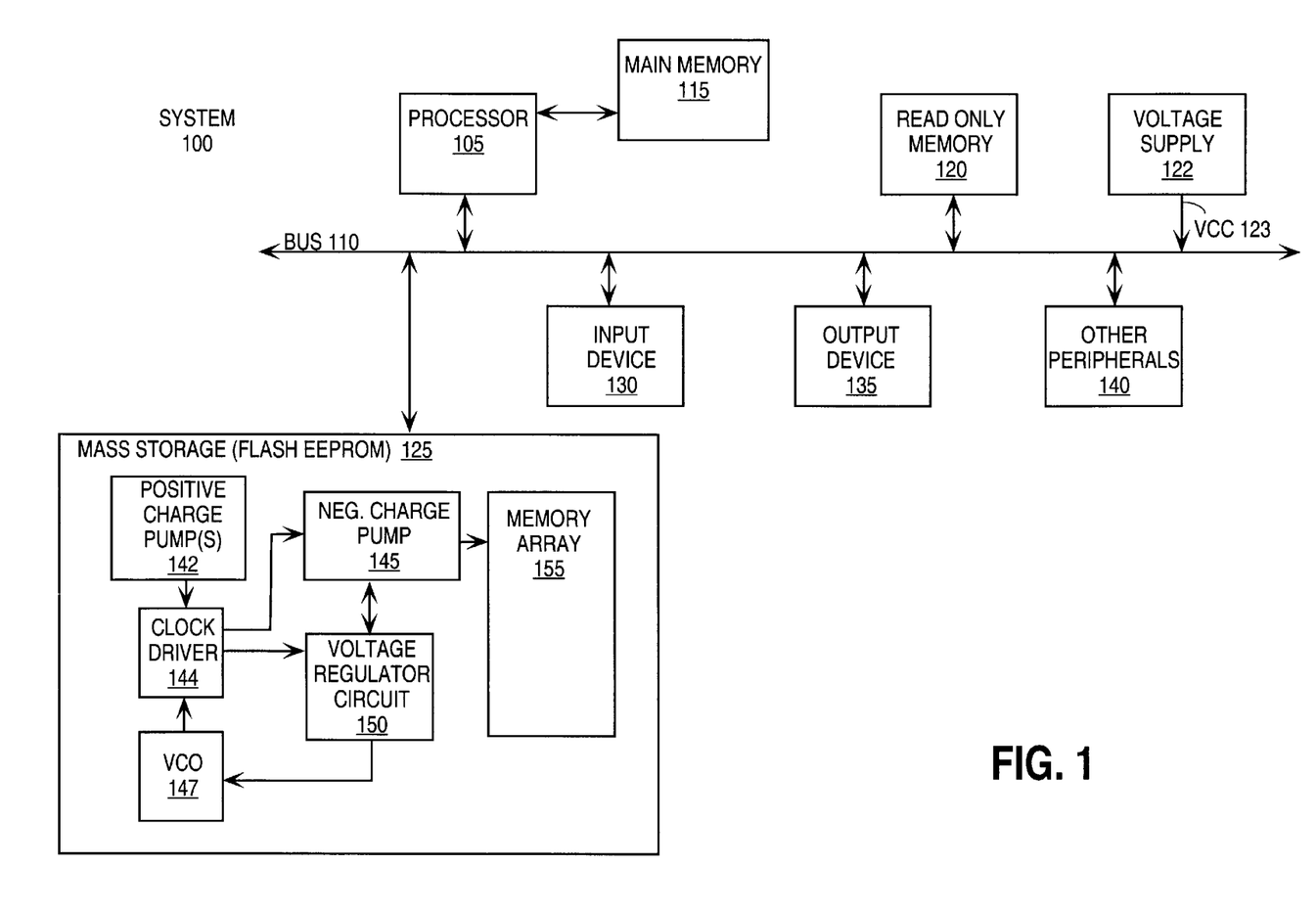
FIG. 1 is a block diagram of a computer system that may be advantageously used for one embodiment.

FIG. 1 shows a block diagram of a system 100 that may be advantageously used for one embodiment. The system 100 is a personal computer system, but may be another type of system such as a server, a digital camera or a cellular telephone, for example, for other embodiments.

The computer system 100 includes a system bus 110 for communicating information between the various components of the computer system 100. A processor 105 for processing instructions is coupled to the system bus 110. The processor 105 is a microprocessor for one embodiment, but a microcontroller, application specific integrated circuit (ASIC) or other type of processor may be used for alternative embodiments. A main memory 115 for temporarily storing instructions and data for the processor 105 is coupled to the processor 105. The main memory 115 includes dynamic random access memory (DRAM), but may include a different type of memory for other embodiments.

Also coupled to the system bus 110 is a read only memory 120 to store static information for the processor 105, a voltage supply 122 to provide the system supply voltage Vcc over the bus 123, a mass storage device 125, an input device 130, such as a keyboard or a cursor control device, and an output device 135, such as a monitor and/or a printer. The computer system 100 may also include other peripheral components 140, such as a memory controller and/or a bus bridge device, for example.

The system supply voltage Vcc for one embodiment is 1.8 volts±150 millivolts (mV) and is provided by a low powered battery. For alternative embodiments, the supply voltage may be higher or lower and may be provided by another type of voltage source.

For one embodiment, the mass storage device 125 comprises flash memory, also referred to as flash electrically erasable programmable read only memory (EEPROM). The mass storage device 125 serves the same function as a conventional hard disk drive for the embodiment shown in FIG. 1. The flash EEPROM mass storage device 125 of one embodiment includes one or more positive charge pump(s) 142, a clock driver 144, a negative charge pump 145, a voltage controlled oscillator (VCO) 147, a voltage regulator circuit 150 and an array of flash memory cells 155. For other embodiments, the mass storage device 125 may be configured in a different manner. The charge pumps 142 and 145, the clock driver 144, the voltage controlled oscillator 147 and the voltage regulator circuit 150 are described in more detail below with reference to FIGS. 3–6.

It will be appreciated that systems configured in a manner other than that shown in FIG. 1 may also be used with alternative embodiments.

Figure 2:
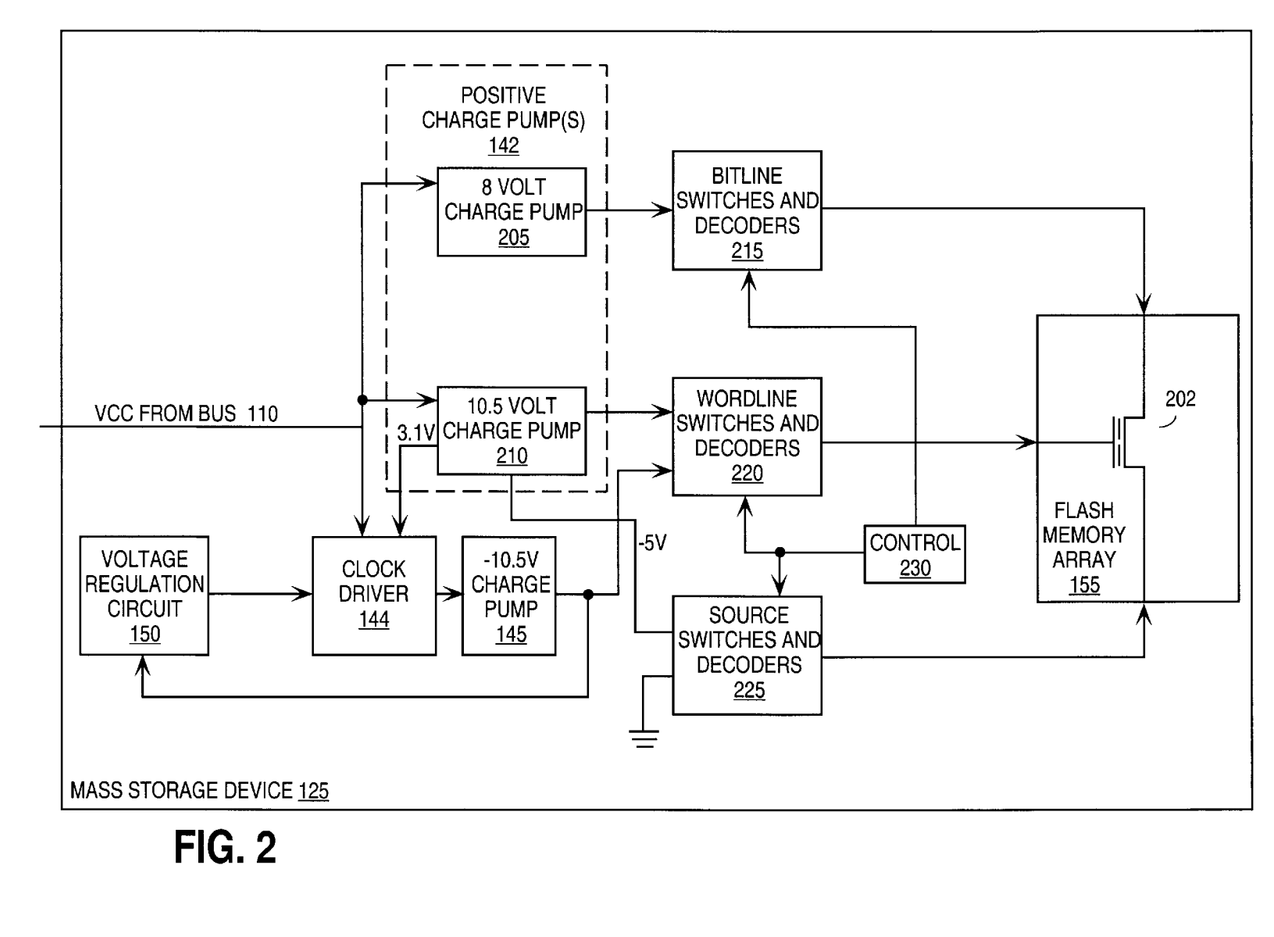
FIG. 2 is a block diagram showing the mass storage device of FIG. 1 in more detail.

FIG. 2 shows the mass storage device 125 in more detail. In particular, FIG. 2 shows circuitry of one embodiment for programming and erasing cells of the flash memory array 155, such as the cell 202. For purposes of illustration, only one memory cell 202 of the memory array 155 is shown in FIG. 2.

For this embodiment, a negative erase technique is used to erase memory cells such as the memory cell 202. The negative erase technique involves the application of a large negative voltage, –10.5 volts for this example, to the gate terminal(s) of memory cell(s) to be erased, while Vcc is provided at the source terminal(s). The Vcc voltage applied at the source terminal(s) is low enough such that the source-substrate junction diode of the memory cell(s) being erased is not broken down. In this manner, only a relatively small source current flows during the erase process. Thus, even though the voltage differential between the gate(s) and source(s) of the device(s) being erased is similar to the differential for a positive erase technique, the negative erase technique requires less current.

Turning to further details of the flash EEPROM mass storage device 125, for one embodiment, the positive charge pump(s) 142 include an 8 volt charge pump 205 and a 10.5 volt charge pump 210. The 8 volt charge pump and the 10.5 volt charge pump may be configured in any manner. For one embodiment, the 8 volt charge pump and the 10.5 volt charge pump are configured in a manner similar to the negative charge pump 145 as described in more detail below. Vcc from the bus 110 (FIG. 1) is supplied to the two charge pump circuits 205 and 210 included within the positive charge pumps 142.

During operations to program one or more cells in the flash memory array 155, a voltage from the charge pump 205 is supplied to a set of bitline switches and decoders 215 that provide voltages to the drain terminals of flash memory cells in the flash memory array 155. Further, a voltage from the charge pump 210 is supplied to a set of wordline switches and decoders 220 that supply voltages to the gate(s) of memory cell(s). During operations to erase one or more cells in the flash memory array 155, a voltage from the negative charge pump 145 is supplied to the wordline switches and decoders 220 while approximately 5 volts from one of the positive charge pumps 142 is supplied to a set of source switches and decoders 225. A different voltage may be supplied to the source switches and decoders for other embodiments. The source switches and decoders 225 supply voltages to the source(s) of memory cell(s) to be erased. The switches and decoders 215, 220 and 225 operate in a manner well-known to those skilled in the art to select particular memory cells to be accessed and to supply the appropriate voltages to the memory cells for the memory access operation being performed.

Each of the sets of switches and decoders 215, 220 and 225 may be controlled by signals from a control circuit 230 to provide the appropriate voltages for erase and programming operations. For one embodiment, the control circuit is a processor designed to provide control of all of the operations of the memory array 155 including reading, programming and erasing operations. The use of such a control circuit is described in U.S. Pat. No. 5,509,134 entitled "Method and Apparatus for Execution of Operations in a Flash Memory Array", M. Fandrich et al., issued Apr. 16, 1996 and assigned to the assignee of the present invention. For alternative embodiments, the control function may be provided in a different manner using an external source of control such as a microprocessor, for example.

For one embodiment, to accomplish negative erase of one or more memory cells in the flash memory array 155, a precise negative voltage is supplied from the negative charge pump 145 through the wordline switches and decoders 220 to the gate(s) of the particular memory cell(s) to be erased.

Figure 3:
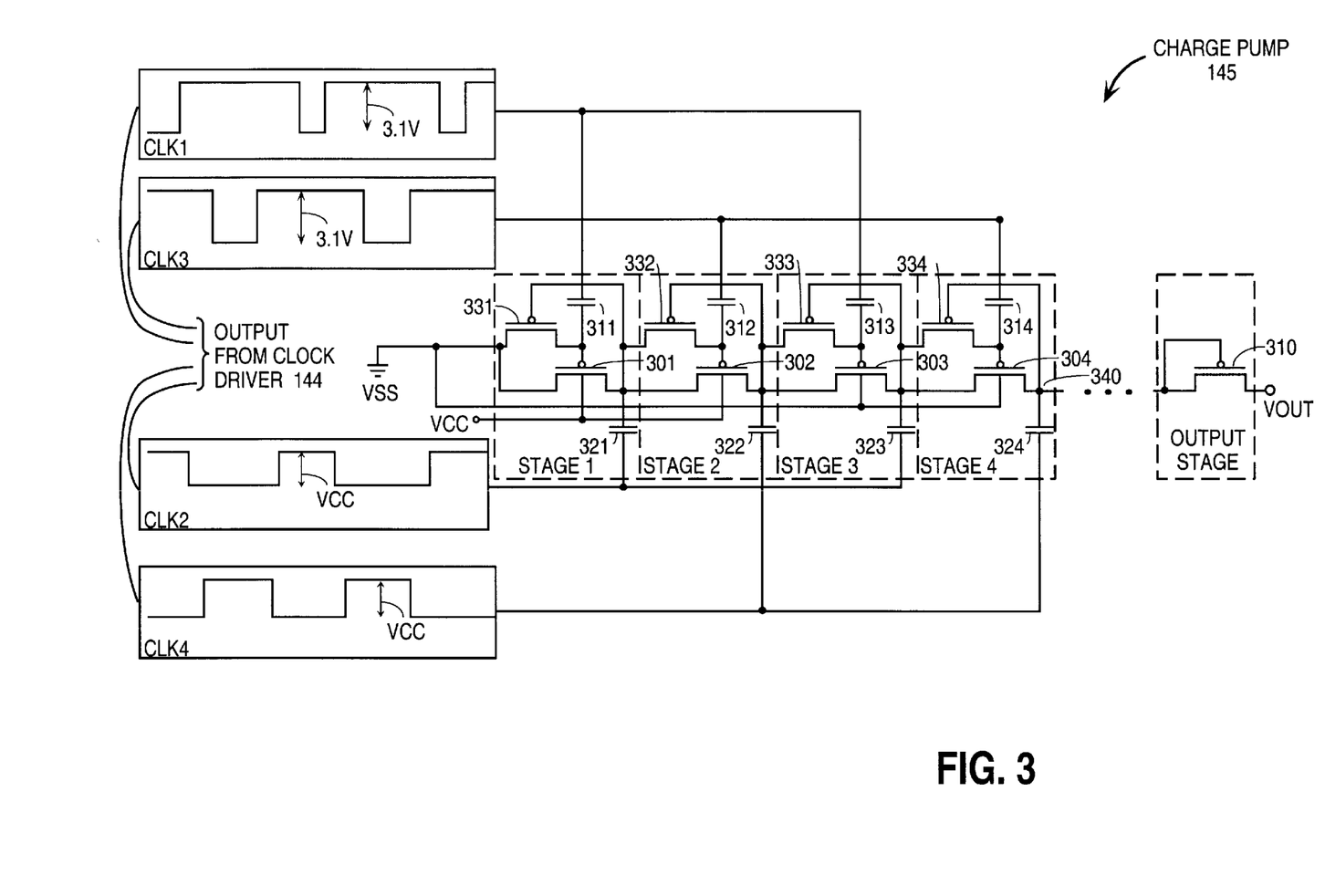
FIG. 3 shows the negative charge pump of FIGS. 1 and 2 in more detail.

FIG. 3 shows the negative charge pump 145 of FIGS. 1 and 2 in more detail. The arrangement of the charge pump 145 shown in FIG. 3 may be used to provide a number of different negative voltage levels including the low negative voltages (i.e. negative voltages large in magnitude) used to erase flash EEPROM memory cells with a negative erase technique.

A first set of input clock signals are supplied to the charge pump 145 via capacitors 311–314 from the sources illustrated as clock 1 and clock 3. A second set of input clock signals are supplied via capacitors 321–324 from the sources illustrated as clock 2 and clock 4.

The charge pump 145 of one embodiment includes p-channel field effect transistors (FETs) 301–304 and 310 connected in series. The transistor 301 has one terminal coupled to ground while the transistor 310 has one terminal coupled to an output terminal Vout. The device 310 is referred to herein as an output stage device. The threshold voltages for the p-channel transistors 301–304 and 310 are approximately 1.5 volts for one embodiment, but may be higher or lower for alternative embodiments.

In addition to the series coupled p-channel transistors 301–304 and 310, each of the stages 1–4 of the charge pump 145 also includes a bootstrap p-channel transistor, 331–334, respectively. The bootstrap transistors 331–334 are used to precharge the gate terminal of the series coupled p-channel device of the corresponding stage. Thus, for example, the first stage (stage 1) of the charge pump 145 is comprised of the transistor device 301, bootstrap transistor device 331 and the capacitors 311 and 321.

For one embodiment, the substrates of the transistors 301 and 302 are coupled to Vcc and the substrates of the transistors 303 and 304 are coupled to Vss. The substrates of the transistors 301 and 302 are coupled to Vcc to prevent latch-up and/or other quality problems that may occur during initial clock cycles to the charge pump 145. If the substrates of the transistors 301 and 302 are coupled to Vss, initial clock cycles to the charge pump 145 may erroneously forward bias the junctions of the transistors 301 and 302. The transistors 303 and 304 are further away from the Vss supply and thus, can have their substrates coupled to Vss with a much lower risk of such issues. The transistors 301–304, 310 and 331–334 of the charge pump 145 may be metal oxide semiconductor (MOS) transistors for one embodiment, however other types of transistors may be used for alternative embodiments.

Two of the clock signals shown in FIG. 3, clock 2 and clock 4, provide a high value of Vcc and a low value of ground. The magnitude of these clock signals (the difference between the high value and the low value of the clock signal) is Vcc. The clock 1 and clock 3 signals, however, provide a high value of 3.1 volts and a low value of ground. The clock 1 and clock 3 signals thus, have a magnitude of 3.1 volts. The clock signals 1 and 3 are referred to herein as pumped clock signals because their magnitude is pumped to be higher than Vcc for this example. The manner in which the clock 2 and clock 4 signals and the pumped clock 1 and clock 3 signals are generated is described in more detail below.

While FIG. 3 shows stages 1–4 of the charge pump 145 in detail, for one embodiment, eight stages are used to supply the −10.5 volts used to erase memory cells of the flash memory array 155. The remaining stages 5–8 are coupled in series between stage 4 and the transistor device 310 in a manner similar to stages 1–4.

In order to describe the operation of the charge pump circuit 145, the operation of a single stage, stage 2, will be discussed. Following the timing diagrams corresponding to the clock signals 1–4 shown in FIG. 3, clock 1 and clock 4 signals are initially low. Since the clock 4 signal is low, the device 332 is initially on. When the clock 2 signal goes low, the negative voltage pulse applied through the capacitor 321 charges the capacitor 312 at the gate terminal of the device 302 through the device 332 to the negative voltage level of the source terminal of the device 302. When the clock 4 signal then goes high, the device 332 turns off, isolating the gate of the device 302 and leaving the capacitor 312 charged to a negative level.

When the clock 3 signal then goes low, because the magnitude of the pumped clock 3 signal is 3.1 volts in this example, and because the capacitor 312 has been precharged to a negative value, the voltage at the gate terminal of the device 302 is appreciably lower than the voltage at its source terminal. Thus, the device 302 is turned on in a region in which it experiences effectively no threshold voltage (Vt) drop. Having the Vt drop across the device 302 effectively equal to 0 means that increased current is transferred more rapidly from the capacitor 321 to the next stage and the voltage passed on to the next stage is of a higher magnitude.

The low clock 2 pulse at the capacitor 321 begins to charge the capacitor 322 toward a value of minus Vcc. When the clock 3 signal then goes high, the device 302 begins to turn off. When the clock 4 signal goes low, the capacitor 322 is charged to approximately minus twice Vcc. The device 332 turns on discharging the gate of the device 302 and bringing it toward the voltage of its drain so that the device 302 turns off rapidly. When the clock 2 signal then goes high, the device 302 stays off and the device 332 stays on so that the charge at the drain and gate terminals of the device 302 is equalized.

Viewing the charge pump circuit 145 as a whole, when the device 301 comes on in response to the falling edge of the pumped clock 1 signal, the capacitor 311 at its gate terminal has been placed at ground through the device 331 which has been turned off. Thus, the gate terminal of the device 301 is forced much lower than its source terminal due to the magnitude of the pumped clock 1 signal. The device 301 is therefore turned on such that it operates in a region in which there is effectively no Vt drop across the device 301.

While turned on, the device 301 charges the capacitor 321 and the capacitor 312 (because the device 332 is also on during this time) to ground level very rapidly. Then, the device 301 begins to turn off as the clock 1 signal goes high. The drop of the clock 2 signal causes the capacitor 321 to go to minus Vcc and completes the turnoff of the device 301 by discharging the capacitor 311 through the device 331. The low clock 2 signal continues the charging of the capacitor 312 until the rise of the clock 4 signal turns off the device 332 leaving the gate of the device 302 charged. As explained above, the device 302 is turned on such that it operates in the region in which it experiences effectively no Vt drop when the pumped clock 3 signal goes low. This is because the low pulse of the pumped clock 3 signal causes the voltage at the gate terminal of the device 302 (which has been precharged to a negative value) to go below the voltage at the source terminal of the device 302. Turning on the device 302 in this manner allows the rapid charge of the capacitor 322 to a negative value of approximately minus twice Vcc.

The same sequence continues through stages 3 and 4 such that a voltage at the node 340 can reach a voltage of minus four times Vcc during operation of the charge pump 145. The same sequence also continues through the remaining stages 5–8 (not shown) until the charge on the last capacitor (not shown) coupled to the source of the device 310 is sufficient to turn on the device 310. For one embodiment, the device 310 is turned on to operate in a range in which it exhibits a Vt drop because a bootstrap transistor (such as the transistors 331–334) is not provided. Where the threshold voltage of the transistor 310 is 1.5 volts, the Vt drop is 1.5 volts.

Thus, the charge pump circuit 145 of FIG. 3 is arranged to provide a negative pumped output voltage having a magnitude approximately equal to the number of pump stages (N) times Vcc, minus the threshold voltage of the output stage device 310 for one embodiment (i.e. Vout=−((N*Vcc)−Vt) for a negative charge pump). For an eight stage charge pump such as the charge pump 145, the voltage at the output node Vout can thus reach approximately the negative of eight times Vcc minus Vt of the device 340, or the negative of 13.2 volts (using the worst case supply voltage of 1.65 for a Vcc of 1.8±150 mV) minus Vt of the device 310. If the device 310 has a Vt of 1.5, the charge pump 145 can provide a pumped output voltage Vout of approximately negative 11.7 volts. A pumped voltage or pumped output voltage, as the terms are used herein, refers to a voltage that is larger in magnitude than a given input voltage to a charge pump or other voltage increasing or decreasing circuitry, for example.

It will be appreciated that, for other embodiments, the charge pump may include a larger or smaller number of stages than that shown in FIG. 3 to provide a charge pump that produces a different negative pumped output voltage for the same or another purpose. Further, it will be appreciated that while the pumped clock signals, clock 1 and clock 3 of FIG. 3, have a magnitude of 3.1 volts in the embodiments described above, for alternative embodiments, the magnitude of the pumped clock signals may be higher or lower.

As will further be appreciated by those skilled in the art, a similar charge pump that replaces the p-channel transistors of the charge pump 145 with n-channel (also referred to as n-type) transistors, and receives a positive input voltage instead of ground at one end of the series coupled transistors, may be used to provide the positive charge pump(s) 142 of FIGS. 1 and 2 or a positive charge pump for a different use.

Figure 4:
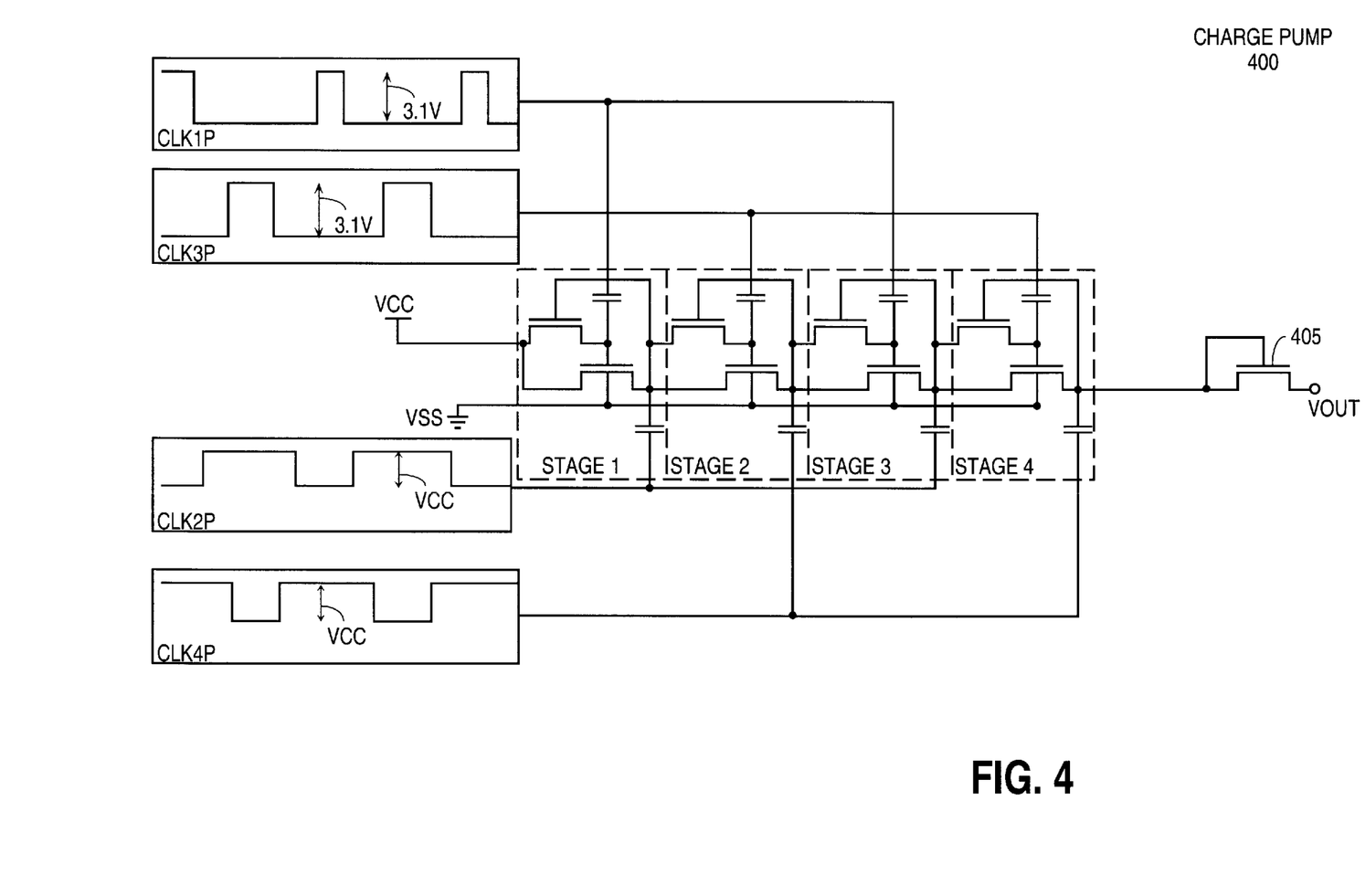
FIG. 4 is a circuit diagram showing one embodiment of a positive charge pump.

An example of such a charge pump is shown in FIG. 4. The charge pump 400 of FIG. 4 operates in a similar manner to the charge pump 145 of FIG. 3 but with the polarities of the signals and voltages reversed. A positive charge pump configured in the same manner as the charge pump 400 of FIG. 4 can provide a positive pumped voltage approximately equal to [(1+N) * Vcc]–Vt of the output stage device 405 where N is the number of pump stages provided in the positive charge pump. Thus, the positive charge pump 400 including 4 stages can provide a positive pumped output voltage of (5 * 1.65)–1.5=6.75 volts where a worst case Vcc of 1.65 is used and the threshold voltage of the output stage device 405 is 1.5 volts.

A positive charge pump such as the charge pump 400 may be used to provide the positive charge pump(s) 142 of FIGS. 1 and 2. Additionally, such a charge pump may be used for positive flash memory cell erase techniques for other embodiments and/or for other purposes for which a pumped voltage may be useful.

The pumped clocks 1 and 3 received by the negative charge pump 145 and the pumped clocks 1P and 3P received by the positive charge pump 400 provide for the charge pumps 145 and 400 to be scaleable to work with low supply voltages. By pumping the clock 1, 3, 1P and 3P signals such that they have a larger magnitude than a low supply voltage, the series-coupled transistors of the charge pump circuits 145 and 400 can operate in a range in which there is effectively no Vt drop across the transistors. In this manner, the number of charge pump stages does not have to be increased for a lower supply voltage to achieve the same pumped output-to-supply voltage relationship.

Further, by using the pumped clocks, the threshold voltages of some of the charge pump transistors for some embodiments may not need to be adjusted to accommodate lower supply voltages. Lower transistor threshold voltages can lead to issues of higher leakage current, for example.

A charge pump in accordance with one or more embodiments may even be operable with a supply voltage below the threshold voltage of one or more transistors in the charge pump. For some embodiments, in order to accomplish this, the clock 2 and clock 4 signals shown in FIG. 3 may also be pumped clock signals. For such embodiments, the number of charge pump stages used to provide a given pumped voltage may be decreased. Pumping the clock 2 and clock 4 signals, however, may decrease efficiency of such a charge pump circuit. For any given charge pump design, the tradeoffs of space, efficiency, threshold voltage and supply voltage may be balanced.

Further, for both the negative charge pump 145 and the positive charge pump 400 of FIGS. 3 and 4, respectively, the output current at the output node Vout is proportional to the input clock frequency. Because the pumped clocks for both of the charge pumps 145 and 400 provide for the series-coupled transistors of each stage to operate in a region in which they experience effectively no Vt drop across them, the capacitors of the charge pumps 145 and 400 can be charged very rapidly. For some embodiments, this obviates the need to provide significant additional overlap between the various clock signals to provide more time for the capacitors to be charged. In this manner, relatively high frequency clock signals can be used to provide a relatively large output current.

Figure 5:
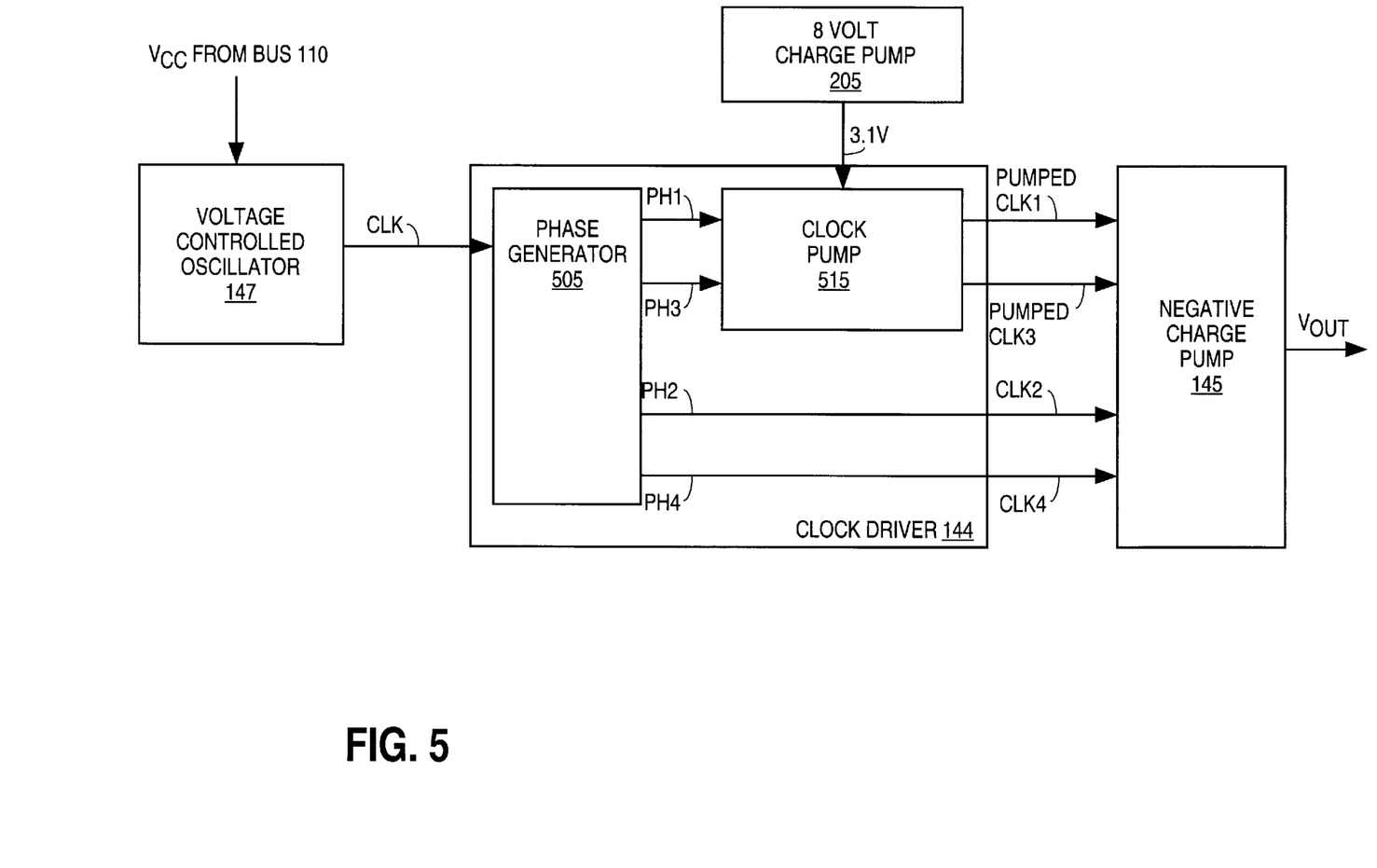
FIG. 5 is a block diagram showing one embodiment of the clock driver that produces the pumped clock signals of FIG. 3.

FIG. 5 shows the clock driver 144 of FIG. 1 in more detail. The voltage controlled oscillator 147 and the clock driver 144 work cooperatively to produce the clock signals 1–4 shown in FIG. 3. For one embodiment, the voltage controlled oscillator 147 receives Vcc from the bus 110 and produces a clock signal CLK at an output. The CLK signal is provided to a phase generator 505 configured on the clock driver 144 that generates four different phases, PH1–PH4 of the CLK signal at its outputs.

The PH1–PH4 signals each have a magnitude of Vcc at the output of the phase generator 505. The PH2 and PH4 signals provide the clock 2 and clock 4 signals respectively. The PH 1 and PH 3 signals are provided to a clock pump 515. The clock pump 515 receives a 3.1 volt signal from an internal stage of one of the positive charge pumps 142 (FIGS. 1 and 2) or other voltage increasing circuitry. The 8 volt charge pump 205 is used in this example to provide the 3.1 volt clock pumping supply, however, any positive charge pump may be used. 3.1 volts is approximately equal to twice Vcc where Vcc is equal to 1.8 volts±150 mV so the 3.1 volt signal may be extracted from the first stage of the 8 volt charge pump 205, for example. The clock pump 515 uses the 3.1 volt power supply signal to pump the magnitude of the PH 1 and PH 3 signals to 3.1 volts to provide the clock 1 and clock 3 signals at its outputs. The clock 1 and clock 3 signals are provided to the negative charge pump 145 in the manner described above with reference to FIG. 3.

The pumped clock signals clock 1P and clock 3P of FIG. 4 may be generated in a similar manner.

Referring back to FIG. 3, the pumped output voltage of the charge pump 145 at the output node Vout fluctuates due to the charging and discharging of capacitors in the circuit. In order to supply a precise negative voltage to be used for flash memory cell erase operations, for example, a voltage regulator circuit such as the voltage regulator circuit 150 (FIG. 2) may be used.

Figure 6:
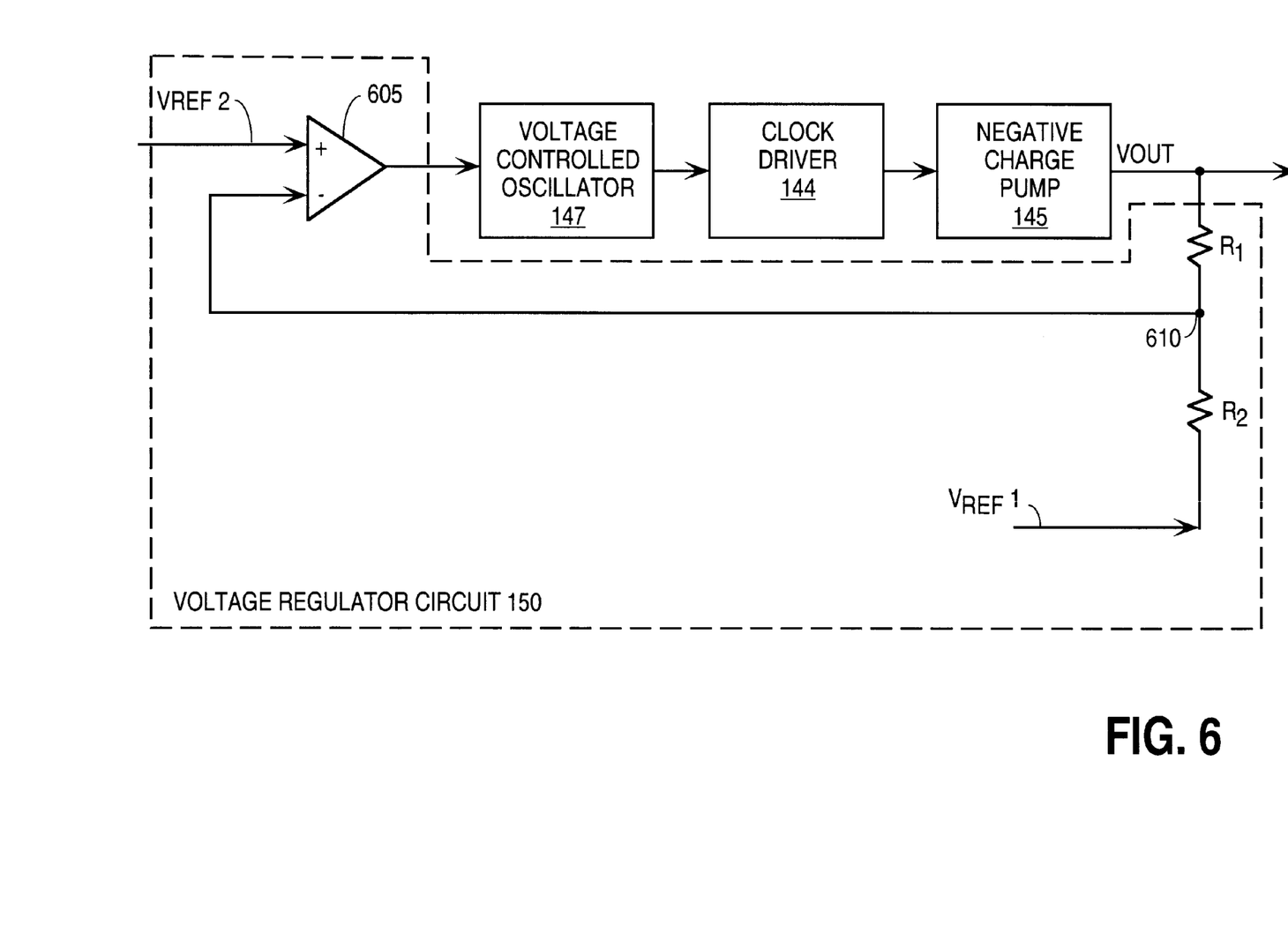
FIG. 6 shows a circuit of one embodiment for controlling the output voltage of the negative charge pump of FIG. 3.

FIG. 6 shows the voltage regulator circuit 150 of one embodiment in more detail. The voltage regulator circuit 150 is coupled to an input of the voltage controlled oscillator 147. The voltage controlled oscillator 147 is coupled to an input of the clock driver 144 which provides the clock 1–4 signals that control operation of the negative charge pump 145.

The voltage regulator circuit 150 controls the operation of the negative charge pump 145 by controlling when the voltage controlled oscillator 147 is enabled to provide clock signals through the clock driver 144. In this manner, the negative charge pump 145 can be turned on when the pumped output voltage Vout at the output of the charge pump 145 is lower in magnitude (i.e. more positive) than the desired output voltage and/or turned off when Vout is higher in magnitude (i.e. more negative) than desired.

The voltage regulator circuit 150 includes two resistors R1 and R2 coupled in series with the output node Vout of the charge pump 145 to form a voltage divider. An opposite end of the series-coupled resistors R1 and R2 is coupled to a first reference voltage Vref 1. It will be appreciated by those skilled in the art that the voltage divider of FIG. 6 may be formed in another manner such as by a series of diode-connected transistors, for example.

The voltage regulator circuit 150 also includes a comparator circuit 605 which may be a differential amplifier for one embodiment. One input of the comparator circuit 605 is coupled to a node 610 of the voltage divider formed of the resistors R1 and R2. Another input of the comparator circuit 605 is coupled to a second reference voltage Vref 2. For one embodiment, Vref 1 has a value of 4 volts while Vref 2 has a value of 1 volt. For this embodiment, the resistances R1 and R2 are selected such that when the voltage at the output node Vout is at the desired level (−10.5 volts for the embodiment described with reference to FIG. 3), the voltage at the node 610 is equal to approximately 1 volt. For different reference voltage levels and/or different desired values for the output voltage Vout, the values of the resistors R1 and R2 may be selected in another manner. Further, different reference voltage Vref 1 and Vref 2 may be used for other embodiments.

In operation, if the level of Vout is greater (i.e. more positive) than the output voltage level desired (−10.5 volts for the embodiment shown in FIG. 3), then the value of the input at the positive terminal of the comparator circuit 605 is more positive than the level provided at the negative terminal of the comparator circuit 605. This input condition of the comparator circuit 605 keeps the voltage controlled oscillator 147 turned on and gradually increases the output of the charge pump 145.

When the level of Vout becomes less (i.e. more negative) than the level desired, then the value of the input at the positive terminal of the comparator circuit 605 is less positive than the level provided at the negative terminal of the comparator circuit 605. This input condition of the comparator circuit 605 turns the voltage controlled oscillator 147 off and gradually decreases the negative output voltage Vout as the voltage buildup on the output capacitance gradually dissipates. In this manner, the voltage level produced at the output of the negative charge pump 145 may be regulated to provide a relatively constant level for Vout.

It will be appreciated that a voltage regulator circuit similar to the voltage regulator circuit of FIG. 6 may also be used to regulate a positive charge pump such as the charge pump 400 of FIG. 4. The reference voltage values and/or resistor values (where resistors are used) for such a circuit may be selected for a different desired value of Vout.

It will also be appreciated that other types of voltage regulator circuits may also be used for various embodiments.

Figure 7:
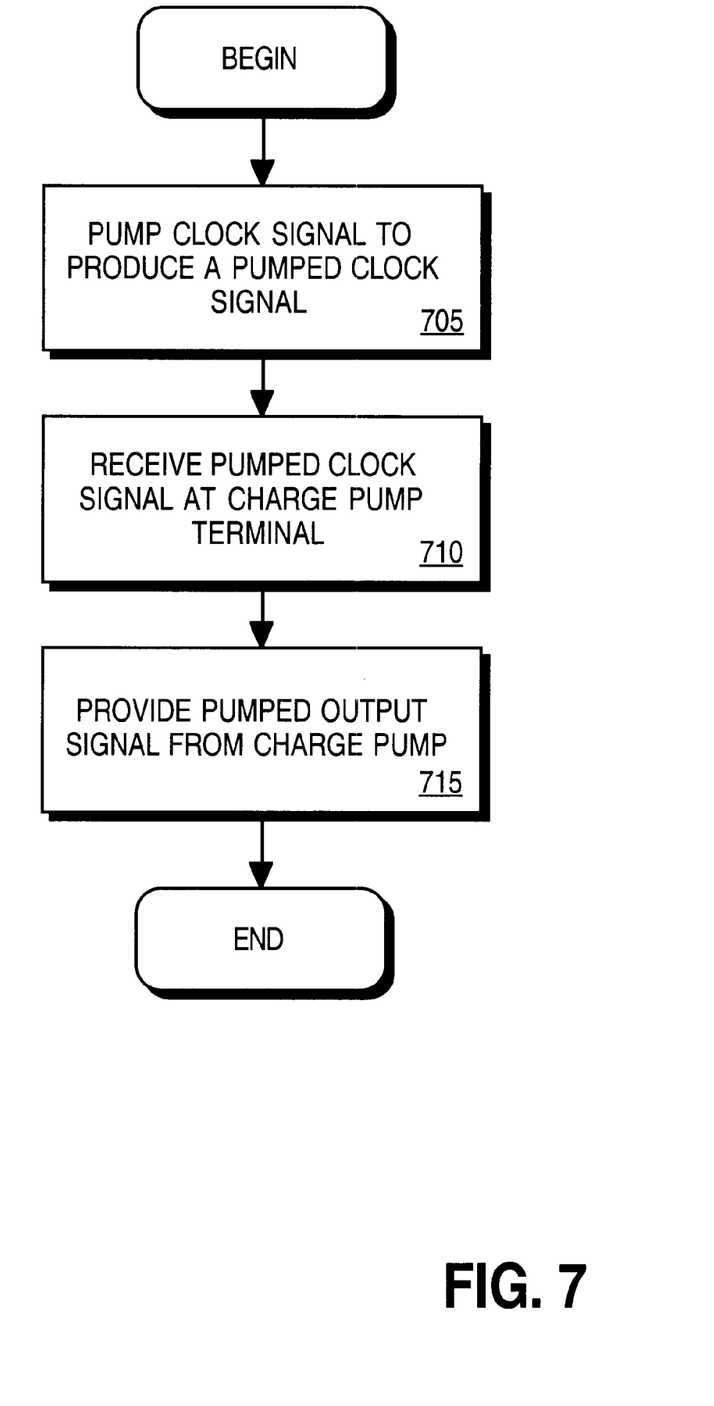
FIG. 7 is a flow diagram showing the method of one embodiment for providing a pumped voltage.

One embodiment of a method for providing a pumped output voltage is now described with reference to FIG. 7. The method includes a step 705 of pumping a clock signal to produce a pumped clock signal having a magnitude larger than a supply voltage. In step 710, the pumped clock signal is received at a charge pump terminal and in step 715, a pumped output signal is provided at an output of the charge pump wherein the pumped output signal has a magnitude larger than the supply voltage.

In the foregoing specification, the invention has been described with reference to specific exemplary embodiments thereof. It will, however be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A charge pump comprising:
   a predetermined number of pump stages coupled in series, at least one pump stage being coupled to receive a first pumped clock signal, the first pumped clock signal being pumped by a clock pump that receives a pumped supply voltage from a second charge pump; and
   an output node coupled in series to one end of the predetermined number of pump stages, the output node to provide a pumped output voltage.

2. The charge pump of claim 1 wherein at least one of the predetermined number of pump stages is coupled to receive a second clock signal having a magnitude equal to a supply voltage of an integrated circuit device that includes the charge pump.

3. The charge pump of claim 1 further including an output stage device coupled between the output node and the predetermined number of pump stages, the output stage device having a first threshold voltage, wherein the magnitude of the pumped output voltage is approximately equal to a supply voltage of an integrated circuit device that includes the charge pump times the predetermined number minus the first threshold voltage.

4. The charge pump of claim 1 wherein an opposite end of the predetermined number of pump stages is coupled to ground and the pumped output voltage is a negative pumped output voltage.

5. The charge pump of claim 2 wherein the at least one pump stage comprises a transistor having a gate coupled to receive the first pumped clock signal through a first capacitor and a terminal coupled to receive the second clock signal through a second capacitor.

6. The charge pump of claim 2 wherein each of the pump stages is coupled to receive one of the first pumped clock signal or a third pumped clock signal having a magnitude equal to the first pumped clock signal and one of the second clock signal or a fourth clock signal having a magnitude equal to the second clock signal.

7. The charge pump of claim 1 further including a voltage regulator circuit coupled to the output node, the voltage regulator circuit to regulate the pumped output voltage by enabling the charge pump when the pumped output voltage drops below a predetermined level and interrupting operation of the charge pump when the pumped output voltage is above the predetermined level.

8. A method for providing a pumped output voltage, the method comprising:
   pumping a clock signal to produce a pumped clock signal using a clock pump that receives a pumped supply voltage from a first charge pump;
   receiving the pumped clock signal at at least one terminal of a second charge pump; and
   providing a pumped output voltage from the second charge pump.

9. The method of claim 8 further including regulating the pumped output voltage to be substantially equal to a predetermined level.

10. The method of claim 8 wherein regulating the pumped output voltage includes
    enabling the second charge pump when the pumped output voltage drops below the predetermined level, and
    interrupting operation of the second charge pump when the pumped output voltage rises above the predetermined level.

11. The method of claim 8 wherein providing a pumped output voltage includes forcing a gate voltage of a transistor in the second charge pump below a source terminal voltage of the transistor.

12. An apparatus comprising:
    a phase generator to output a plurality of phases of an input clock signal;
    a clock pump to receive a pumped supply voltage from a first charge pump, the clock pump to pump at least one of the plurality of phases of the input clock signal to generate a pumped clock signal having a magnitude substantially equal to that of the pumped supply voltage; and
    a second charge pump to receive the pumped clock signal at a first node.

13. The apparatus of claim 12 wherein the phase generator is to output four phases of the input clock signal.

14. The apparatus of claim 13 wherein the clock pump is to pump two of the four phases to generate first and second pumped clock signals.

15. The apparatus of claim 14 wherein the second charge pump comprises a plurality of stages, each stage to receive one of the first or second pumped clock signals.

16. The apparatus of claim 14 wherein the second charge pump comprises a plurality of stages, each stage to receive one of the first or second pumped clock signals and one of the remaining two phases.

17. The apparatus of claim 12 wherein the first node is a transistor gate.

* * * * *